March 18, 1952 H. NELSON 2,589,846
VENETIAN BLIND MECHANISM
Filed Sept. 3, 1947 3 Sheets-Sheet 1
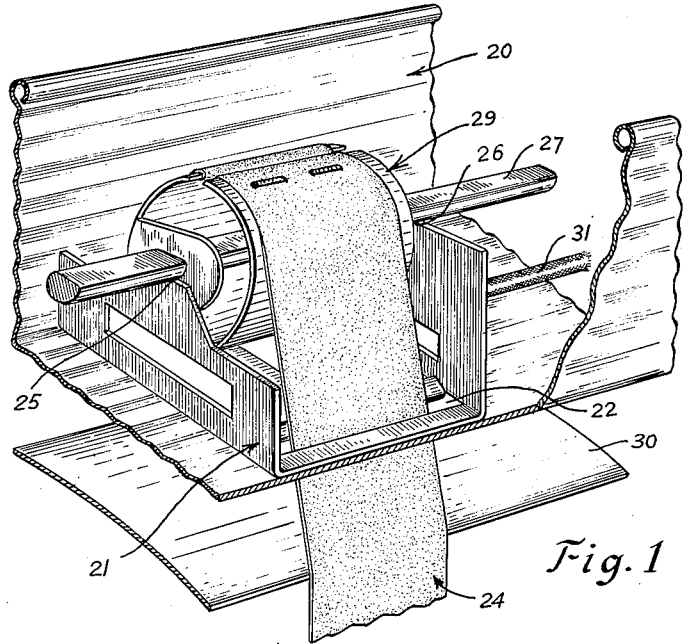
Fig. 1
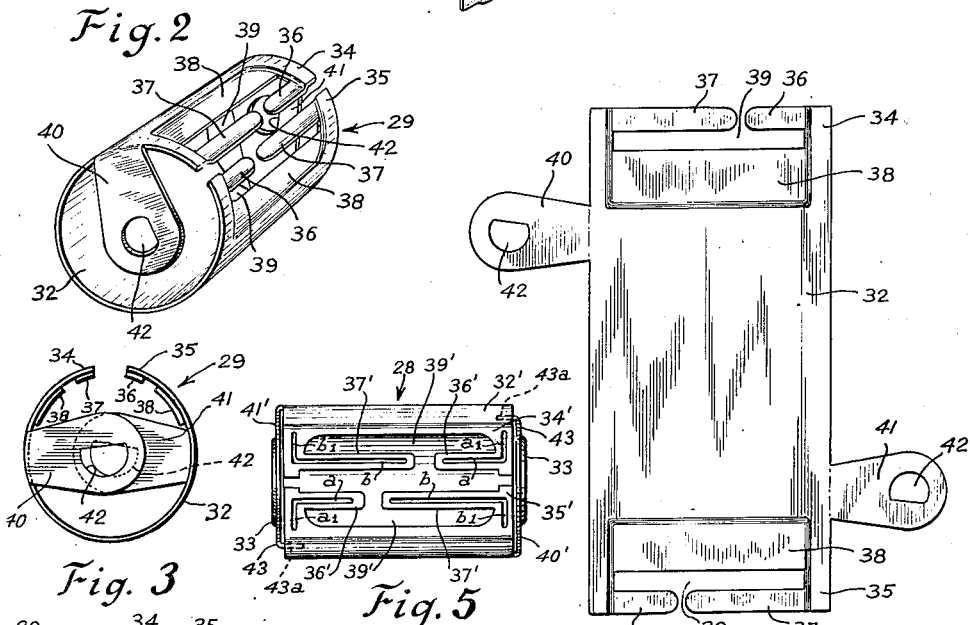
Fig. 2
Fig. 5
Fig. 4
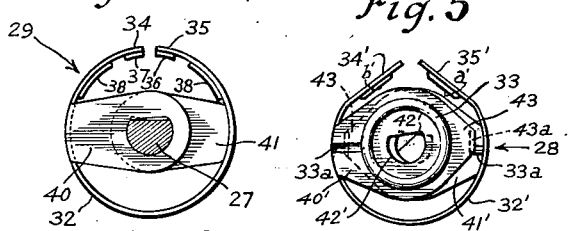
Fig. 3   Fig. 5a
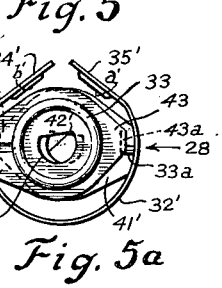
Fig. 3a
INVENTOR
HARRY NELSON
BY
Ramsey, Kent & Chisholm
HIS ATTORNEYS March 18, 1952     H. NELSON     2,589,846
VENETIAN BLIND MECHANISM Filed Sept. 3, 1947     3 Sheets-Sheet 2

INVENTOR
HARRY NELSON
BY
Ramsey, Kent + Chisholm
HIS ATTORNEYS

March 18, 1952  H. NELSON  2,589,846
VENETIAN BLIND MECHANISM
Filed Sept. 3, 1947  3 Sheets-Sheet 3

INVENTOR
HARRY NELSON
BY
Ramsey, Kent & Chisholm
HIS ATTORNEYS

UNITED STATES PATENT OFFICE 2,589,846

VENETIAN BLIND MECHANISM

Harry Nelson, New York, N. Y., assignor to Lorentzen Hardware Mf'g. Corp., New York, N. Y., a corporation of New York Application September 3, 1947, Serial No. 771,981

12 Claims. (Cl. 160—177)

This invention relates to Venetian blinds, and more particularly to mechanism for tilting the slats of Venetian blinds.

In the enclosed head bar type of Venetian blind, the upper ends of the two branches of each ladder tape pass upwardly through the bottom of the head bar and are simultaneously shifted to effect tilting of the slats of the blind. The shifting movement is conventionally effected by means of a tape carrier or rocker to which the two branches of a tape are attached. The upper ends of the ladder tapes are often formed into loops for convenience of attachment to the tape rockers. Each blind has two or more ladder tapes, with a tape rocker for each ladder tape. The tape rockers, which are contained within the head bar, are oscillated in unison by a tilt rod upon which they are mounted and which in turn is oscillated by a tilter mechanism.

The tilt rod of such a blind is normally a length cut from a cold rolled steel rod of noncircular cross section. In assembling the tape rockers on the rod, they are slid along the rod to their proper position. In a much-used construction the rod is received by holes formed in the body of the tape rockers, these holes having a cross section corresponding with that of the rod so as to transmit to the tape rockers the angular movement which is imparted to the tilt rod.

Tilt rods are often found to be of nonuniform cross-sectional dimension, since the commercial cold rolled stock employed for making the rods has rather wide manufacturing tolerances. Accordingly, the holes formed in the tape rockers for reception of the tilt rod must be sufficiently large to receive the largest portions ordinarily encountered in the rod stock. This results in instances of excessive clearance between the rod and the tape rocker, with attendant play or lost motion between the tilt rod and the tape rocker. This is objectionable in a Venetian blind, since it hinders accurate tilting adjustment of the slats thereof.

The present invention obviates the foregoing difficulties; and in the forms shown the tape rocker is composed of a resilient sheet metal stamping. The body of the tape rocker is provided with two spaced tilt-rod-engaging portions having holes therein corresponding to the cross-sectional shape of the tilt rod. However, one of the holes is angularly displaced with respect to the other, so that the holes may be said to be slightly out of phase. Manual constrictive pressure applied to the rocker is sufficient to circumferentially flex its resilient body and bring the holes into phase. In such flexed condition the rocker may be freely passed along the tilt rod. When the rocker has been positioned at the desired point on the tilt rod, the constrictive force is removed, whereupon the rocker resiliently seeks its unflexed condition, thereby causing the normally out-of-phase tilt-rod-engaging holes to tightly engage the tilt rod. Thus, lost motion between the rod and the rocker is effectively eliminated, and the rocker is held against movement along the rod.

The forms shown of the present invention all embody generally cylindrical or drum-shaped tape rockers, which provide a smooth extended bearing surface for the ladder tape branches, thereby preventing excessive wear of the tapes and facilitating easy tilting of the slats at a uniform rate. In addition, in one form of the invention shown, the tape-engaging portions of the rockers have T-shaped slots that provide opposing fingers for receiving previously-looped ends of the ladder tape branches. This obviates the use of a hairpin-like member or the like for attaching the ladder tape to the rocker, while permitting end loops to be provided on the ladder tape branches prior to their connection with the tape rocker.

A general object of the present invention is to eliminate, in an improved and advantageous manner, lost motion between a Venetian blind tilt rod and a part associated therewith for concomitant rotation.

Another object of the invention is to provide a tape rocker or other tilt-rod-engaging part for a Venetian blind that will resiliently engage a tilt rod of noncircular cross section.

Another object of the invention is to provide a Venetian blind tape drum or rocker which, when slightly flexed, slides freely on the tilt rod and which, when released, grips the rod.

A further object of the invention is to provide a tape rocker of simple and improved construction which may be economically and rapidly formed as a sheet metal stamping.

A still further object is to provide for a Venetian blind a fitting having a portion particularly adapted for engagement with the looped end of a ladder tape branch in a facile and advantageous manner.

Further objects, and objects relating to details and economies of construction, operation and use, will more definitely appear from the detailed description to follow.

My invention is clearly defined in the appended claims. Where parts are, for clarity and convenience, referred to on the basis of their oriented position shown in the accompanying drawing, limitation as to positioning of the entire structure is not necessarily to be implied, since it will be understood that the entire structure may be inverted and that it may be used in certain inclined positions. Also in both the description and the claims, parts may at times be identified by specific names for clarity and convenience, but such nomenclature is to be understood as having the broadest meaning consistent with the context and with the concept of my invention as distinguished from the pertinent prior art. The best forms in which I have contemplated applying my invention are illustrated in the accompanying drawing forming part of this specification, in which:

Fig. 1 is a fragmentary perspective view of an enclosed head bar type of Venetian blind incorporating a first form of the invention, a portion of the head bar being broken away to show concealed structure.

Fig. 2 is a perspective view of the tape rocker shown in Fig. 1.

Fig. 3 is an end elevation of the tape rocker shown in Figs. 1 and 2.

Fig. 3a is an end elevation similar to Fig. 3 after insertion of the tilt rod.

Fig. 4 is a geometrical development, substantially into a plane, of the tape rocker shown in Figs. 1 to 3a inclusive.

Fig. 5 is a top plan view of a second form of tape rocker.

Fig. 5a is an end elevation of the tape rocker shown in Fig. 5.

Figure 7:
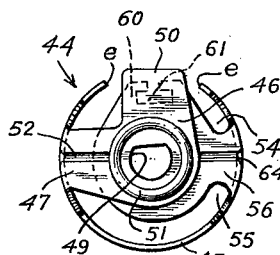
Fig. 7 is an end elevation of the tape rocker shown in Fig. 6, the hairpin-like member being omitted.

Referring to Fig. 1, the general organization of an enclosed head bar Venetian blind is shown. A channel-shaped head bar 20 contains the operating mechanism of the blind. The head bar shown is formed of a sheet metal channel but the present invention is equally applicable to certain other types of head bars. One assembly of ladder tape, tilt rod, tilt rod cradle, and tape rocker is shown, it being understood that such an assembly is provided for each ladder tape of the blind, at least two ladder tapes being used in each blind and the tilt rod being common to all of the assemblies.

A tilt rod cradle 21 is secured within the channel 20, the bottom of the cradle having a pair of slots 22 (one shown) which register with similar slots in the bottom of the head bar. Slots 22 are adapted to pass the vertical branches of the usual Venetian blind ladder tape 24. The tilt rod cradle 21 is generally U-shaped and rotatively supports a tilt rod 27 in notches or bearings at 25 and 26 in the upper portion thereof.

The tilt rod 27 is shown as a metal rod of D-shaped cross section, and it is usually a length cut from cold rolled steel stock. The tilt rod 27, which may also be hexagonal or of any other non-circular cross section, extends within the head bar 20 so as to pass through and operate in unison a plurality of tape rockers 29 (one shown), one rocker for each ladder tape 24 (one shown). The tilt rod 27 may be operated by a conventional tilter mechanism (not shown), oscillating this rod so as to effect tilting of the slats of the blind, of which the topmost slat 30 is shown.

The tilt rod cradle 21 also serves as a cord guide to change the direction of the lift cord 31 for raising and lowering the blind, this lift cord being reeved in any usual manner. All of the above-noted construction is shown generally in my copending application S. N. 601,671, which has matured into Patent 2,455,135 of November 30, 1948.

The construction of the tape rocker 29 is shown in Figs. 2, 3, 3a and 4. This rocker, which is a first form of the present invention, is formed as a sheet metal stamping. The tape rocker 29 has a body 32 of drum-like or cylindrical contour provided with tape-engaging portions 34 and 35 which are slightly spaced from each other to permit temporary constriction of the body 32 and also to facilitate attachment of the ladder tape, as will be referred to hereinafter.

The configuration of the various component parts of the tape rocker 29 may be best noted from the development shown in Fig. 4. This development indicates a body portion 32 of generally rectangular outline having tape-engaging portions 34 and 35 at its opposite ends. Each of these tape-engaging portions comprises a pair of opposing, spaced, aligned fingers 36 and 37 formed by T-shaped slots 39. The length of each slot 39 is slightly greater than the width of a ladder tape branch. Each opposing pair of fingers 36 and 37 is adapted to receive the previously looped end of a branch of the ladder tape, as will be explained later. Each branch is customarily provided with a preformed loop, made by turning back the end portion of the web and stapling it or otherwise securing it to the body of the web. The fingers 36, 36 are much shorter than the fingers 37, 37 to facilitate engagement of the ladder tape branches, as will be explained. Since the terminal portion of each ladder tape branch is of double thickness, due to the end portion of the branch being doubled back to form a loop, the fingers 36, 36 and 37, 37 and the zones 38, 38 may be slightly depressed inwardly from the surface of the body 32 so as to permit the ladder tape to lie smoothly across the surface of the tape rocker body.

Tilt-rod-engaging portions or arms 40 and 41 extend outwardly on opposite sides of the body 32 when geometrically developed as in Fig. 4. These arms are spaced from tape-receiving portions 34 and 35 and are preferably approximately 180° apart on the cylindrical rocker as seen in Figs. 3 and 3a.

Tilt-rod-engaging portions 40 and 41 are each provided with a D-shaped hole 42 corresponding with the cross-sectional shape of the tilt rod 27. Holes 42, 42 are, however, enough larger than the nominal size of rod 27 to slidably receive this rod despite commercial variations in its cross-sectional dimensions.

Referring to Figs. 2, 3 and 3a, the body 32 of the tape rocker 29 has a drum or cylindrical form. From opposite ends of the body 32, the tilt-rod-engaging portions or arms 40 and 41 extend inwardly, the centers of holes 42, 42 being spaced slightly from the axis of the body 32 on opposite sides of such axis. As has been mentioned, the arms 40 and 41 are circumferentially spaced on the drum formation by about 180°. As shown in Fig. 3 the two holes 42, 42 are cross-axially displaced and are out of phase.

By circumferentially flexing or constricting the body 32 slightly, as by manually pressing on opposite sides thereof, the noncircular holes 42, 42 are brought into alignment with the two holes in phase, i. e. in angular coincidence. With the drum held in this condition the tilt rod 27 may be passed freely through the holes 42, 42. The tape rocker 29 is slid longitudinally on the tilt rod 27 to the desired position and then the pressure on the opposite sides of the rocker body 32 is removed. The body 32 resiliently expands, attempting to resume its unflexed condition. This resiliently constrains the holes 42, 42 toward the out of phase relationship shown in Fig. 3, with the result that the arms 40 and 41 tightly engage the tilt rod 27 and obviate lost motion between the rod and the rocker.

The two tilt-rod-engaging portions or arms 40 and 41 are sufficient, when located at opposite ends of the tape rocker 29 and extending inwardly from opposite sides of the tape rocker, to support the body 32 of the tape rocker against the weight of the blind as well as against any force to which the rocker may be reasonably expected to be subjected in use. In this connection it may be noted that downward pull on the ladder tape imposes an expanding force on the rocker drum, thereby causing the arms 40 and 41 to more tightly grip the tilt rod 27.

After complete assembly of the head bar 20, including installation of the tilt rod 27 and tape rockers 29 therein, the previously looped upper ends of the branches of ladder tape 24 are threaded upwardly through the slots 22 of the tilt rod cradle 21, after which the ladder tape branches are attached to the tape rocker. This is most easily accomplished with the tape rocker 29 in approximately the rotative position shown in Fig. 1, i. e. with the tape-engaging portions 34 and 35 at the top of the rocker. The preformed loop at the end of one ladder tape branch is telescoped onto the nearest long finger 37, the material of the loop being crowded onto the finger 37 sufficiently to permit the trailing end of the loop to pass between the fingers 36 and 37. Then the material of the loop is smoothed out, so that a portion thereof telescopes onto the opposing finger 36. The other branch of the ladder tape is then similarly attached to the other pair of fingers 37 and 36. It will be apparent that the unequal length of the opposing fingers 37 and 36 greatly facilitates the attachment of the ladder tape by means of loops that have been preformed on the upper ends of the two branches of the ladder tape.

Reference will now be had to Figs. 5 and 5a which show a second form of tape rocker, designated as a whole by 28. In construction and operation this second form is similar to the first form designated as a whole by 29; and only the differences from the first form will be referred to. Corresponding parts are designated by the same reference characters with a prime mark added.

In rocker 28 the ladder-tape-receiving fingers 36' and 37' have longitudinal beads or corrugations $a$ and $b$ impressed therein, as shown in Fig. 5. These beads stiffen the fingers, reinforcing them against bending. Preferably these beads are extended in L-shaped fashion into the body 32' at $a_1$ and $b_1$. Increased stiffness in the zone of attachment of the fingers 36' and 37' to the body 32' is additionally obtained by shaping the ends of the T-slots 39', 39' as shown in Fig. 5. Instead of depressing merely a part of the tape-receiving portions 34' and 35' to enable them to smoothly accommodate the double thickness caused by looping the ends of the ladder tape branches, the entire portions 34' and 35' may be bent inwardly and made generally flat as shown in Fig. 5a.

The tilt-rod-engaging arms 40' and 41' are formed with circular beads 33, 33 which are so embossed as to project out at the ends of the rocker. These beads, which surround the holes 42', 42', reinforce the arms 40' and 41' and also act as bearing rings which may engage the sides of the cradle 21 when the rocker is installed as in Fig. 1. The arms 40' and 41' are further reinforced by grooves 33a, 33a which extend longitudinally of the arms and may, if desired, continue around the corner into the body 32'.

The free ends of arms 40' and 41' may be extended at 43, 43 and bent inwardly to form tabs 43a, 43a. These tabs, by engaging the opposite side of the drum-like body 32', limit the amount that the drum can be constricted when force is applied thereto to bring the holes 42', 42' into registration. If desired the tabs 43a, 43a may be so positioned as to stop constriction of the drum formation at the point where holes 42', 42' are in registration. In some instances I prefer to omit extensions 43, 43 and tabs 43a, 43a. In such case the drum can be so proportioned that constriction is arrested, with holes 42', 42' in registration, by the edges adjacent to 34' and 35' striking each other.

Reference will now be had to the third form of the invention, which is shown in Figs. 6 to 11 inclusive. The tape rocker 44 shown in these figures has a resilient generally cylindrical or drum-shaped body 45. From the development of Fig. 11 it will be noted that the rocker has similar tilt-rod-engaging portions 46 and 47 projecting on the opposite sides of the body 45. These portions, which are circumferentially displaced by about 180° on the drum formation, each having a D-shaped hole 49 formed therein. These holes are slightly out of phase so as to resiliently engage the tilt rod 27 in the manner previously described.

Each tilt-rod-engaging portion 46 and 47 is provided with an extending ear 50, the ears extending upwardly in the formed tape rocker for a purpose which will be pointed out later. In addition, the tilt-rod-engaging portions 46 and 47 may each be provided with a circular bead 51 and with a groove 52 extending from the circular bead into the body 45 of the tape rocker. These beads and grooves serve to reinforce the tilt-rod-engaging portions 46 and 47 against bending, being similar in function to the beads 33 and grooves 33a of tape rocker 28 (Figs. 5 and 5a). In addition, the body 45 may be notched at 54 and 55 on each side of the tilt-rod-engaging portions 46 and 47, these notches serving to facilitate the inward bending of the tilt-rod-engaging portions in forming the tape rocker.

A second pair of arms 56 and 57 project from the body 45 of the tape rocker oppositely from the tilt-rod-engaging portions 46 and 47. The arms 56 and 57 are each provided with a circular hole 59 which is of sufficient size so that the tilt rod 27 may be passed therethrough with clearance such that these arms do not normally engage the rod. The arms 56 and 57 are provided with ears 60, 60, each of these ears having a small T-shaped slot 61. Each of these arms may also be provided with a circular bead 62 surrounding the hole 59 and with a groove 64 running from the circular bead into the body 45 of the tape rocker. These beads and grooves likewise serve to reinforce the arms against bending. If the tape rocker 44 is subjected to excessive load, the resilient body 45 may temporarily be deformed, the arms 56 and 57 then engaging the tilt rod 27 and aiding in preventing further deformation.

Notches at 58, 58 and 63, 63 serve a purpose similar to that of the notches at 54, 54 and 55, 55.

From Figs. 6 to 9 inclusive, it will be noted that in the formed tape rocker 44 the tilt-rod-engaging portions 46 and 47 and the arms 56 and 57 both extend inwardly, the axis of the rocker passing through the holes 49, 49 and 59, 59. The tilt-rod-engaging portions 46 and 47 are on the extreme ends of the tape rocker 44, being located outside of the arms 56 and 57.

Figure 6:
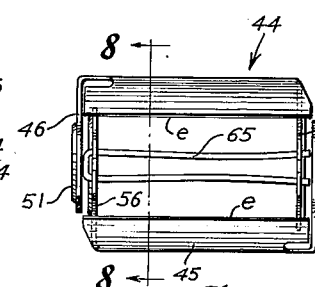
Fig. 6 is a top plan view of a third form of tape rocker, including a hairpin-like ladder tape-engaging member.
Figure 8:
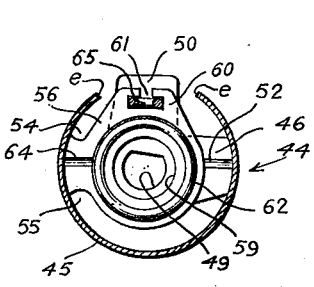
Fig. 8 is a cross section taken on the line 8—8 of Fig. 6.
Figure 9:
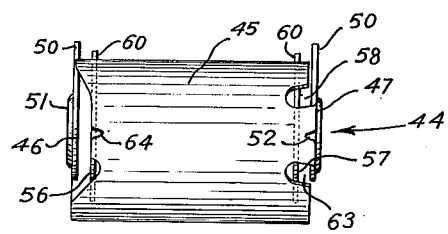
Fig. 9 is a side elevation of the tape rocker shown in Fig. 6, the hairpin-like member being omitted.
Figure 10:
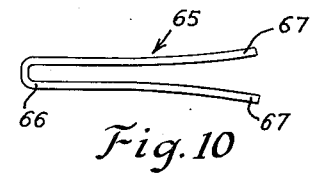
Fig. 10 is a top plan view of the hairpin-like ladder-tape-engaging member of the tape rocker shown in Figs. 6 to 9, inclusive.

In this form of tape rocker, the two edges, e, e of the body 45 do not approach each other as closely as in the form previously described, a considerable gap remaining as indicated in Figs. 6 to 8 inclusive. The T-shaped slots 61, 61 are centered in this gap and are adapted to receive a springy hairpin-like member 65 as shown in Fig. 6. The looped end 66 of the member 65 may be slipped endwise into one slot 61 and the free ends 67, 67 of the member independently engaged in the other slot 61. With the member 65 so positioned in the slots 61, 61, the ears 50, 50 which are positioned opposite the ends 66 and 67 of the member 65, prevent this member from slipping endwise within the slots and becoming disengaged therefrom.

The tape rocker 44 is installed in the assembly shown in Fig. 1 in the same manner as tape rockers 28 and 29, previously described. After assembly of the head bar 20 and its associated mechanism, the ends of the branches of ladder tape 24 are passed upwardly through the slots 22, 22 as previously noted, these tape branches having preformed terminal loops thereon. The hairpin-like member 65 is then engaged with the loops of both branches of the ladder tape 24, one leg of this member passing within each loop and the tape branches being positioned on opposite sides of the tape rocker 44. The member 65 may then be engaged in the T-shaped slots 61, 61 of the tape rocker, the branches of the ladder tape 24 lying against the surface of the body 45 of the tape rocker 44, similar to their arrangement in the assemblies embodying the tape rockers 28 and 29 previously described.

A fourth form of my improved tape rocker is shown in Figs. 12 to 16 inclusive. In this form the tape rocker 69 also has a resilient cylindrical sheet metal body, designated by 70. This tape rocker embodies a somewhat different method of engaging the tilt rod 27 (Fig. 1) but embodies a construction somewhat similar to that of tape rocker 44 (Figs. 7–11) for engaging the ends of the ladder tape branches.

Figure 15:
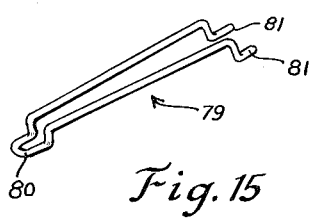
Fig. 15 is a perspective view of a hairpin-like member for engaging the looped ends of Venetian blind ladder tape, this member being especially constructed for use with the tape rocker shown in Figs. 12 to 14, inclusive.

The body 70 is provided with a pair of T-shaped slots 76, 76 to receive a hairpin-like tape fastener 79 of the form shown in Fig. 15. It will be noted that the looped end portion 80 and the free ends 81, 81 of fastener 79 are so offset downwardly that these ends may be engaged in the slots 76, 76 with the intervening portion of the member 79 lying along and slightly spaced from the body 70 of the tape rocker.

Figure 16:
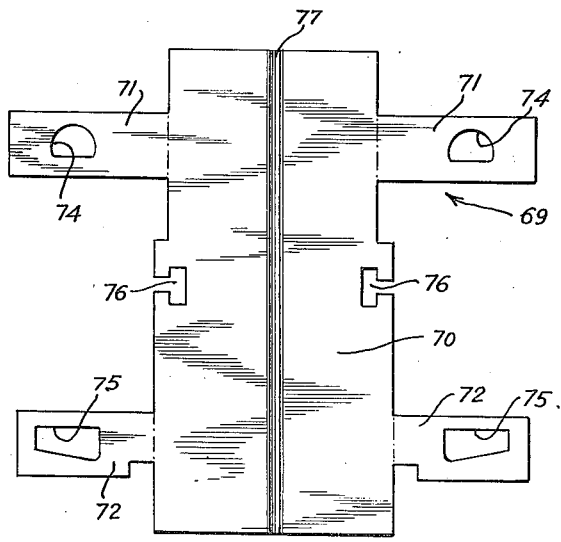
Fig. 16 is a geometrical development, substantially into a plane, of the tape rocker shown in Figs. 12 to 14, inclusive.

The configuration of various portions of the tape rocker 69 may be gathered from the development of Fig. 16. The body 70 is provided with two pairs of tilt-rod-engaging arms or portions 71, 71 and 72, 72. The arms 71, 71 in the formed tape rocker project inwardly from one side of the body 70 and have D-shaped holes 74, 74 located approximately axially of the body and of a shape corresponding to the cross section of the tilt rod 27. The holes 74, 74 are in phase and may be freely slipped along the tilt rod 27. The other pair of arms or tilt-rod-engaging portions 72, 72 also extend inwardly and are located immediately outside of the arms 71, 71. The arms 72, 72 are provided with holes 75, 75 located approximately axially of the body 70, these holes having a wedge-shaped configuration as shown in Figs. 13 and 16 and being of sufficient size (except toward their narrower ends) to receive the tilt rod 27.

Figure 13:
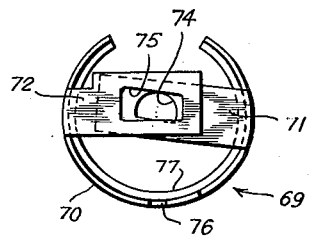
Fig. 13 is an end elevation of the tape rocker shown in Fig. 12.
Figure 14:
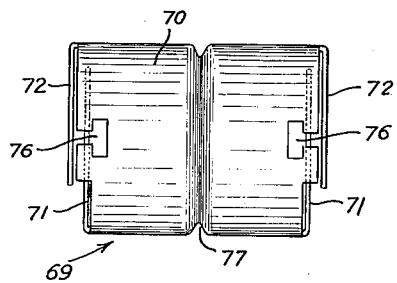
Fig. 14 is a top plan view of the tape rocker shown in Figs. 12 and 13.

Referring to Fig. 13, it will be seen that when the rocker is not circumferentially constricted the converging margins of the wedge-shaped holes 75, 75 overlie a small area of the holes 74, 74. By slightly constricting the rocker 69, as by hand pressure on its opposite sides, the holes 74, 74 may be shifted toward the wide ends of holes 75, 75 sufficient to uncover the entire area of the holes 74, 74 and permit the tilt rod to be inserted. With tape rocker 69 held constricted it may then be freely moved along the tilt rod 27. Upon release of the pressure on the tape rocker 69, it will tend to resume its original shape, moving the wedge-shaped holes 75, 75 radially relative to the holes 74, 74 and causing the converging margins of the holes 75, 75 to tightly engage the tilt rod 27 and thereby prevent any idle rotative movement between the rod and the tape rocker as well as prevent movement of the tape rocker along the rod. The body 70 of the tape rocker 69 may be stiffened by a circumferential inwardly pressed bead 77 extending about the body midway of its ends.

The tape rocker 69 is installed in the head bar assembly shown in Fig. 1 in a manner similar to the tape rockers 28, 29 and 44 previously described, the slots 76, 76 being positioned at the top of the installed rocker. The ladder tape branches are then passed upwardly through the slots 22, 22 in the tilt rod cradle 21, terminal loops having previously been formed on the ends of the ladder tape branches. The fastener 79 is then engaged with the ladder tape branches in a manner similar to that of the fastener 65 (Figs. 6 and 10) of tape rocker 44. The looped end 80 of the fastener is extending inwardly of the body for mounting the rocker on the tilt rod; each of the arms having a hole larger than the rod, at least one of the holes being noncircular, and the two holes being overlapped insufficiently, when the tape rocker is unstrained, for free insertion of the rod through both holes; and the two arms being attached to the body at different circumferential locations thereon, whereby stress applied to the body to change the distance between the confronting longitudinal edges thereof also resiliently shifts the relative position of the arms and increases the overlap between the holes for insertion of the tilt rod through both arms and, upon removal of the applied stress, the arms are resiliently urged toward their initial position and thereby grip the rod.

5. For incorporation in a Venetian blind head bar having a noncircular tilt rod, a tape rocker as in claim 4 in which the holes in the two arms are alike and have a shape corresponding generally to the cross-sectional shape of the tilt rod.

6. For incorporation in a Venetian blind head bar having a noncircular tilt rod, a tape rocker as in claim 4 in which the hole in one arm makes an easy sliding fit with the tilt rod and the hole in the other arm has opposite side walls which converge and wedgingly grip the tilt rod when the applied stress is removed from the rocker.

7. For incorporation in a Venetian blind head bar having a noncircular tilt rod, a tape rocker as in claim 4 in which there are means to arrest the strain of the tape rocker when the two holes reach substantial coincidence.

8. For incorporation in a Venetian blind head bar having a noncircular tilt rod: a tape rocker of resilient sheet metal comprising a part-cylindrical body having confronting longitudinal edges located at the top thereof, means located adjacent to such edges for engaging the vertical branches of a ladder tape, and a pair of arms extending inwardly of the body for mounting the rocker on the rod: each of the arms having a hole larger than the rod, each of the holes having a shape corresponding generally to the cross-sectional shape of the tilt rod, at least one of the holes being noncircular, and the two holes being overlapped in a direction opposite to the spacing between said confronting edges, and the overlap being insufficient when the tape rocker is unstrained for free insertion of the rod through both holes; and the two arms being attached to the body at different circumferential locations thereon, whereby stress applied to the body to decrease the distance between the confronting longitudinal edges thereof also yieldingly shifts the relative position of the arms and increases the overlap between the holes for insertion of the tilt rod through both arms and, upon release of the stress, the arms are resiliently urged toward their initial position and thereby grip the rod, and whereby downward pull applied to the ladder-tape-engaging means increases the grip on the rod.

9. In a Venetian blind head bar organization, a tilt rod having a flat extending longitudinally thereof, and a tape rocker composed of a resilient one-piece sheet metal stamping comprising a part-cylindrical body having confronting longitudinal edges and having means for engaging the vertical branches of a ladder tape, and a pair of arms extending inwardly of the body, each of the arms having a hole somewhat larger than the rod and which is provided with a flat corresponding to the flat on the rod, the body of the stamping being disposed in spaced relation to the rod with the rod passing through the holes in said arms, and the stamping being under strain and resiliently urging the flats of the holes in the arms into holding engagement with the flat on the rod, whereby oscillation of the rod is imparted to the tape rocker and lost motion between the rod and the tape rocker is obviated.

10. For a Venetian blind, a tape rocker comprising a part-cylindrical body having confronting, longitudinal edges, the portions of the body adjacent said edges each being provided with a T-shaped slot defining a pair of aligned opposed fingers of markedly different length separated by a relatively narrow slot extending to the longitudinal edge of the body, the fingers of each pair being adapted to receive the looped end of a ladder tape branch, and said body having tilt-rod-engaging means for supporting the tape rocker.

11. For a Venetian blind, a stamped sheet metal fitting for receiving the individually looped branches of an end of ladder tape, said fitting having a T-shaped slot formed in each of two longitudinal edge portions and defining along each longitudinal edge a pair of aligned opposed fingers of markedly different length separated by a relatively narrow slot extending to the longitudinal edge of the fitting, the fingers of each pair being adapted to receive a looped end of the ladder tape branch.

12. In a Venetian blind head bar organization including a tilt rod, a tape rocker of resilient sheet material mounted on the tilt rod, and a ladder tape attached to the tape rocker; the improvement which comprises: the tilt rod having a flat extending longitudinally thereof, the tape rocker having a part-cylindrical body surrounding the tilt rod with confronting longitudinal edges located above the tilt rod, the tape rocker also having two arms extending inwardly from the body and attaching the body to the tilt rod, the two arms being located at the opposite ends of the body, being attached to the body at different circumferential locations thereon, and each having a hole through which the tilt rod extends, each of the holes being slightly larger than the tilt rod and having a flat mating with the flat on the tilt rod, the tape rocker body being under circumferential strain which resiliently urges the confronting longitudinal edges thereof away from each other and resiliently urges the arms in opposite circumferential directions whereby the flats of the holes in the arms resiliently grip the flat on the tilt rod, and the vertical branches of the ladder tape extending upwardly on opposite sides of the tape rocker body and each branch being attached to the tape rocker body adjacent the contiguous longitudinal edge thereof whereby load on the tape urges the confronting longitudinal edges apart and adds to the force with which the flats of the holes in the arms grip the flat on the tilt rod.

HARRY NELSON.

REFERENCES CITED

The following references are of record in the file of this patent:

UNITED STATES PATENTS

| Number | Name | Date |
| --- | --- | --- |
| 2,132,991 | Mintz | Oct. 11, 1938 |
| 2,396,425 | Hunter | Mar. 12, 1946 |
| 2,534,080 | Stuber et al. | Dec. 12, 1950 | then inserted in one of the T-shaped slots 76 and the free ends 81, 81 independently entered into the other slot 76. The intervening portion of the fastener 79 then lies slightly spaced from the outside cylindrical surface of the body 70 of the tape rocker. The ladder tape lies along the top surface of the tape rocker 69, generally similar to its arrangement in the assembly shown in Fig. 1.

All four forms of the tape rocker herein described are provided with a resilient cylindrical sheet metal body which, upon slight collapsing deformation by pressure of the hand on opposite sides of the tape rocker, may be easily slid along a tilt rod of noncircular cross section. Upon removal of the collapsing force, each of these tape rockers tends to resume its original shape and, as a result, tightly and resiliently engages the tilt rod so as to obviate all rotative idle movement between the tilt rod and the tape rocker as well as locking the tape rocker against movement along the tilt rod. The weight of the blind slats, carried by the ladder tapes, exerts an outward force on any of the tape rockers herein described, tending to spread them. This force causes the tape rockers to engage the tilt rod more firmly.

Figure 17:
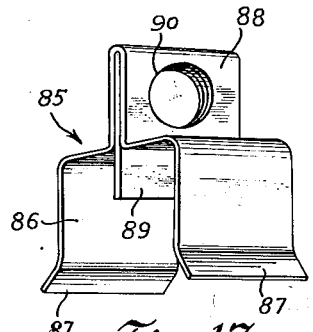
Fig. 17 is a perspective view of a hand tool for circumferentially flexing a tape rocker of the present invention for application of the rocker to a tilt rod.
Figure 11:
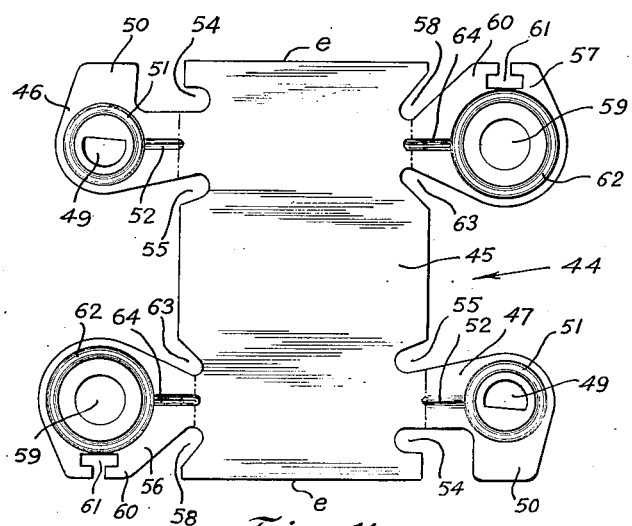
Fig. 11 is a geometrical development, substantially into a plane, of the tape rocker shown in Figs. 6 to 9, inclusive.
Figure 18:
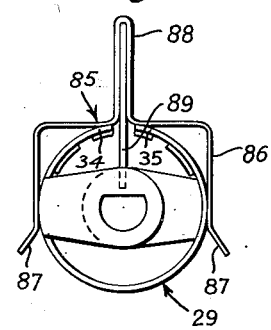
Fig. 18 is an end elevation of the hand tool shown in Fig. 17 in applied position on the tape rocker shown in Figs. 2, 3, 3a and 4.
Figure 12:
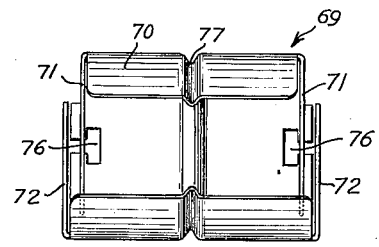
Fig. 12 is a plan view of a fourth form of tape rocker, the rocker in this view being shown as it would appear when rotated on its axis to bring it into inverted position.

In installing any of the herein disclosed tape rockers on the tilt rod 27, a constricting tool similar to that shown in Figs. 17 and 18 may be employed. This tool, designated as a whole by 85, comprises a relatively stiff short length of metal channel 86 which may have the cross-sectional form shown in Fig. 18. The outwardly flared free edges 87, 87 of the channel aid in telescoping it over the rocker, e. g., rocker 29 which is shown in Fig. 18 by way of illustration.

A doubled-over outwardly-extending portion 88 serves as a convenient handle for application and removal of the tool from the rocker. A tongue 89 within the portion 88 projects downwardly midway between the parallel sides of the channel 86 and is adapted to enter the space between the tape-engaging portions 34 and 35 of the rocker. A hole 90 in the portion 88 facilitates handling of the tool.

The size of the channel 86 is such that, when the tool 85 is forced over the rocker, e. g. rocker 29, the rocker will be properly constricted for free movement along the tilt rod 27. The sides of the channel are preferably slightly converged towards the flared ends 87, 87, to retain the rocker in the channel. Also, the length of the channel 86 is preferably somewhat less than the length of the tape rocker.

In assembly of a head bar, one tool 85 is placed on each of the tape rockers that are to be incorporated in the bar, thus providing for free movement of all of the rockers along the tilt rod 27 during assembly. After the assembly is completed, the tools 85 may be withdrawn from the tape rockers, permitting the rockers to make resilient engagement with the tilt rod 27.

The form of rocker shown in Figs. 12–16 has no space at the top to receive projection 89 of the constricting tool. Therefore this projection should be omitted from the tool when it is to be used for constricting that form of rocker.

It will be seen that in all forms of the invention that are disclosed, the tape rocker is a resilient sheet metal stamping having a part-cylindrical body which has confronting longitudinal edges. At least one pair of arms extends inwardly from the body for mounting the rocker on a noncircular tilt rod. In the form of the invention shown in Figs. 2, 3 and 3a, there is the pair of arms 40, 41. In the form of the invention shown in Figs. 5 and 5a, there is the pair of arms 40', 41'. In the form of the invention shown in Figs. 7–11, there is the pair of arms 46, 47. In the form of the invention shown in Figs. 12–16, there is a first pair of arms 71, 72 and also a second pair of arms 71, 72.

The holes in the various arms just referred to are all larger than the tilt rod but the holes in the two arms of a pair are only in partially overlapping relation with the result that the tilt rod cannot be freely inserted through the two arms of a pair when the tape rocker is unstrained. In this connection, "strain" is considered in its mechanical sense, viz., deformation or distortion due to stress or force. Since the two arms of a pair, in each of the forms of the invention disclosed, are connected with the part-cylindrical body at different circumferential locations, stress applied to the body in such direction as to change the space between the confronting longitudinal edges of the body will also resiliently vary the relative angular position of the two arms of a pair. In the forms of the invention disclosed, the holes in the two arms of a pair are initially out of registration in such direction that constriction of the tape rocker body, i. e., stress which moves the confronting longitudinal edges closer together, will increase the overlap between the holes for insertion of the tilt rod through both arms. If the holes were initially out of registration in the opposite direction, strain induced in the body in such direction as to increase the distance between the confronting longitudinal edges would increase the overlap between the holes and permit insertion of the tilt rod through both arms.

After the tilt rod has been inserted and the tape rocker is in position thereon, the distorting stress is removed. When the stress is removed, the rocker, due to its resiliency, tends to return to its unstrained condition. Through this action, the two arms are urged toward their initial relative position and thereby grip the tilt rod. At least one hole in one of the mounting arms has a noncircular portion which engages a noncircular surface of the tilt rod and thereby obviates rotative lost motion between the tilt rod and the tape rocker.

What I claim is:

1. In a Venetian blind, the combination of a ladder tape having an individually looped tape branch end and a sheet metal fitting having a T-shaped slot therein extending out to one of the marginal edges and defining a pair of slightly spaced opposing aligned fingers of unequal length, the total length of the fingers approximating the width of the ladder tape branch, and the fingers receiving the looped tape branch end thereabout.

2. In the art of Venetian blinds, in combination with a tape rocker having a resilient body constrictively deformable for application to a tilt rod, a tape rocker constrictor comprising a body having opposite sides for engaging the body of the rocker and maintaining it in constricted condition.

3. In the art of Venetian blinds, a tape rocker constrictor for constrictively deforming a tape rocker having a resilient body for application to a tilt rod, said constrictor comprising a channel-shaped body formed of a base and two generally parallel sides, and a tongue projecting from the base into the body midway between the sides.

4. For incorporation in a Venetian blind head bar having a noncircular tilt rod: a tape rocker of resilient sheet metal comprising a part-cylindrical body having confronting longitudinal edges and having means for engaging the vertical branches of a ladder tape, and a pair of arms